United States Patent [19]

Deering

[11] Patent Number: 4,754,412

[45] Date of Patent: Jun. 28, 1988

[54] ARITHMETIC LOGIC SYSTEM USING THE OUTPUT OF A FIRST ALU TO CONTROL THE OPERATION OF A SECOND ALU

[75] Inventor: Michael F. Deering, Mountain View, Calif.

[73] Assignee: Schlumberger Systems & Services, Inc., Palo Alto, Calif.

[21] Appl. No.: 785,351

[22] Filed: Oct. 7, 1985

[51] Int. Cl.$^4$ .............................................. G06F 7/38
[52] U.S. Cl. .................................................. 364/736
[58] Field of Search ............... 364/736, 200 MS File, 364/900 MS File; 370/67, 112; 358/160; 382/41

[56] References Cited

U.S. PATENT DOCUMENTS

| | | | |
|---|---|---|---|
| 3,875,391 | 4/1975 | Shapiro et al. | 364/736 |
| 4,242,733 | 12/1980 | Deal | 382/41 |
| 4,377,846 | 3/1983 | Yoshida | 364/736 |
| 4,407,018 | 9/1983 | Kanemasa | 364/736 |
| 4,467,444 | 8/1984 | Harmon, Jr. et al. | 364/736 |
| 4,653,112 | 3/1987 | Ouimette | 382/41 |

FOREIGN PATENT DOCUMENTS 0136834 4/1985 European Pat. Off. ............ 364/736

Primary Examiner—Gary V. Harkcom
Assistant Examiner—Long Thanh Nguyen
Attorney, Agent, or Firm—Theodore S. Park; Robert C. Colwell; James A. Deland

[57] ABSTRACT

An arithmetic logic system for performing a variety of arithmetic and logical functions on pixel input streams such as averaging down the input image stream, computation of absolute values, and signed or unsigned, clipped or unclipped, addition, subtraction and multiplication. The arithmetic logic system has a first arithmetic logic unit connected to a plurality of input signals. A second arithmetic logic unit is coupled to the first arithmetic logic unit and operates on the output of the first arithmetic logic unit. A control unit is coupled to the first and second arithmetic logic units and controls the operation of the second arithmetic logic unit based on the output of the first arithmetic logic unit.

14 Claims, 3 Drawing Sheets

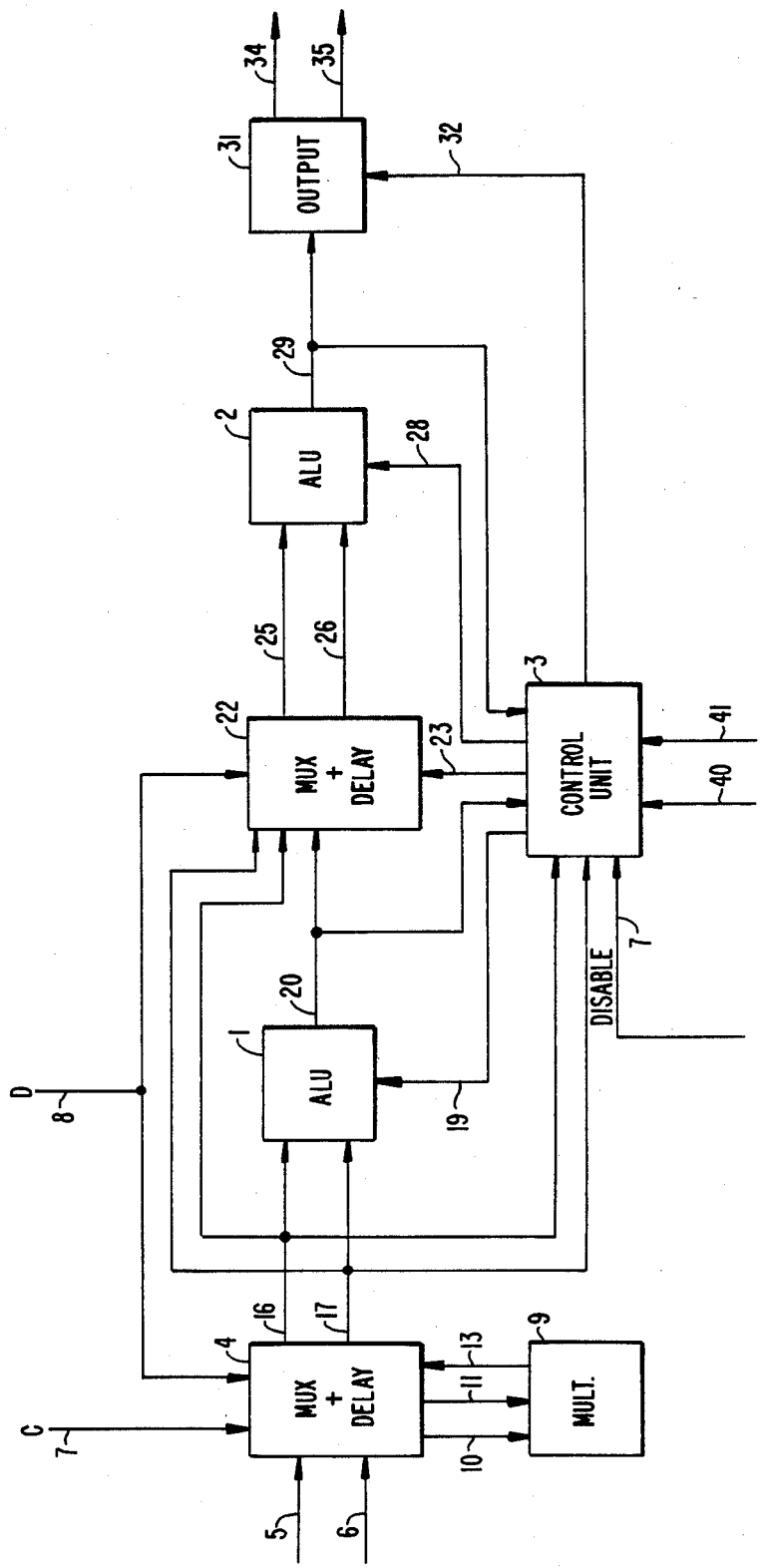
FIG._1.

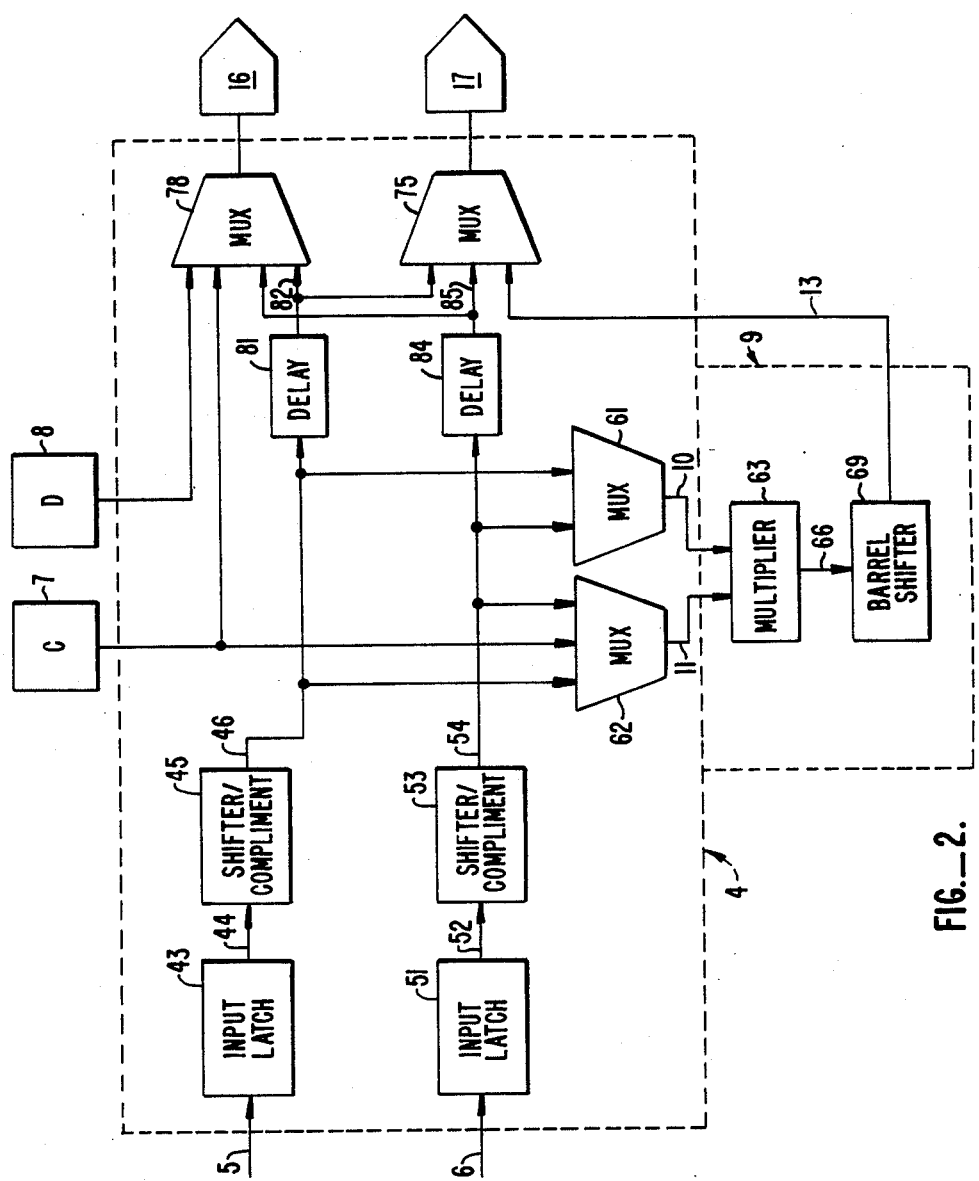
FIG._2.

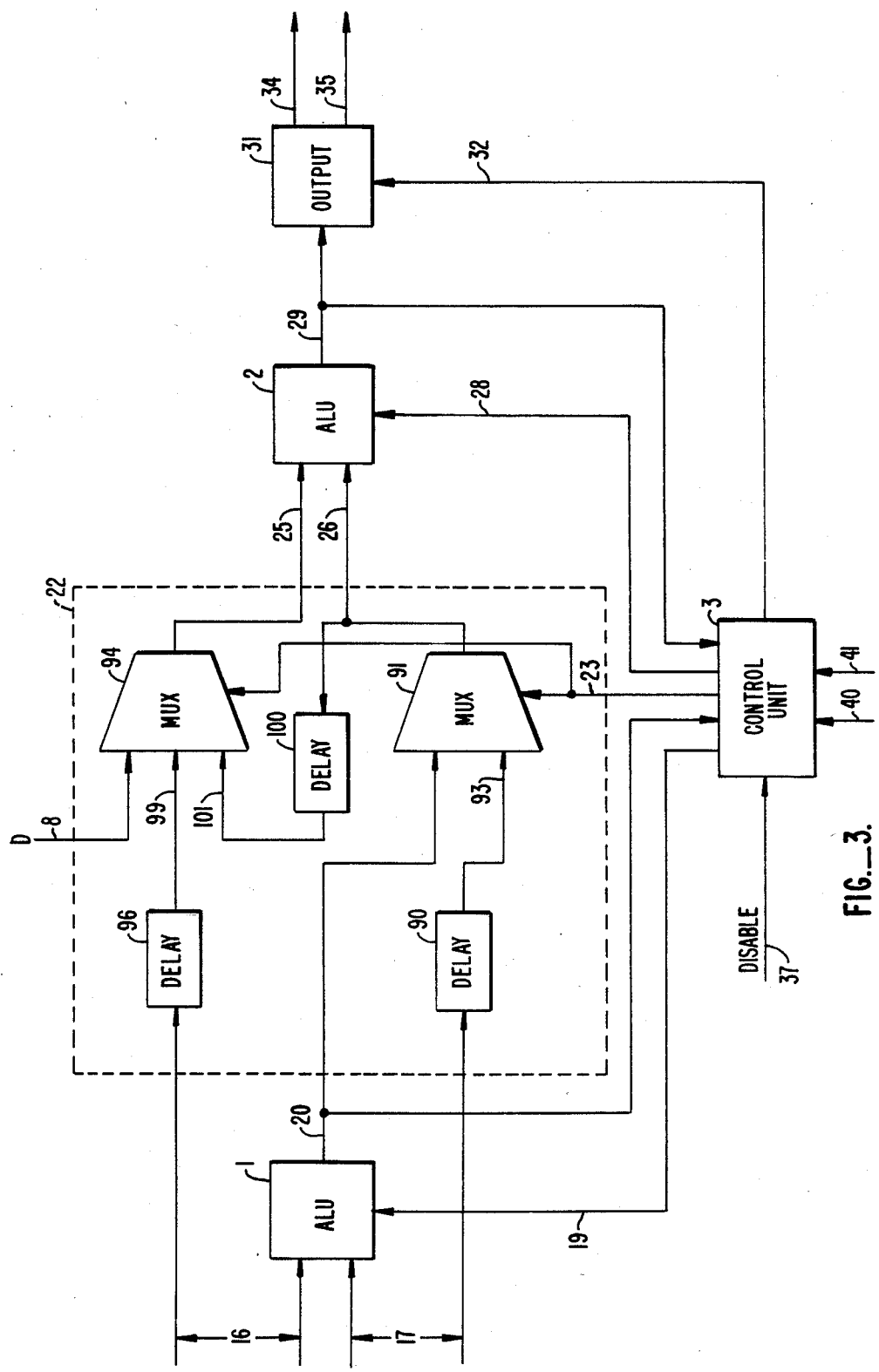
FIG._3.

ARITHMETIC LOGIC SYSTEM USING THE OUTPUT OF A FIRST ALU TO CONTROL THE OPERATION OF A SECOND ALU

BACKGROUND OF THE INVENTION

The invention relates generally to digital image processing and, more particularly, to the modification of digital images.

Recent advances in automation utilize artificial intelligence to identify objects and to provide information relating to the position, shape, orientation, and other characteristics of the object.

The "eye" of the artificial intelligence system is a video camera and processor that generates a digital image comprising a series of frames. Each frame is comprised of pixels which are the smallest area unit of the image. The location of a pixel in the frame is indicated by its x,y coordinates. The y coordinate identifies the line of the frame and the x coordinate identifies the position in the line of each pixel.

Each pixel in the frame is assigned a digital value by the image processing system. These digital values are utilized in subsequent processing.

Once the "eye" of the system has formed an image, the "brain" of the system must interpret the image. One method of interpreting the image is to store in memory some selected characteristics of a reference object. The video system then analyzes the video image to determine the selected characteristics of objects in the image. These determined characteristics of the objects and the image may then be compared to the stored characteristics of the reference object.

For example, if the selected characteristic were the projection of the reference object on the x axis of the frame, then a reference value of this projection is stored in memory. The determined value of the projection of an object in an image is supplied to a processor. The processor then compares the projection of the referenced object and the imaged object and decides whether the objects are identical.

Unfortunately, most image sensors in cameras do not produce perfect images. The imperfections can arise from many sources. Dirt, highlights, and distortions in the air or lens optics may distort the image before it ever arrives at the sensor. The sensor itself will add further distortions, since the individual pixels of the area array may have slightly different response characteristics.

A common type of distortion is uneven response of different parts of the sensor. For example, the images produced might always seem brighter towards the center of the image. To correct the image, a separate frame buffer that holds a custom gain and offset for each pixel of the sensor may be used. As each pixel is brought in, it is "boosted" by multiplying the pixel value by a value stored in the correction frame buffer, and "stretched" by subtracting from the pixel valve another value stored in the correction frame buffer.

If the image signal is very low, one may have a low signal to noise ratio. To correct this, one must boost the signal. One method is to average together the images of several frames. This is accomplished by adding successive frame data together. As many frames as desired can be summed together, with two through eight frames being the normal range. An even more complex averaging allows one to separately weigh the images as they are summed together. This is accomplished by multiplying the pixel in the given frame by a constant value before it is summed with the pixels in the other frames.

When matching an image, portions of the input image are compared with portions of the reference image in storage. For example, the system will compare all rectangular corners in the reference sample with those in the input image. For real time throughputs, one may not have time to look everywhere in fine detail for the rectangles. To facilitate matching, it usually is necessary to first average down the image to half size (or less) to reduce the search space. After the most likely candidates have been found, they can then be re-examined at higher resolution. For a half-size image reduction the output frame is formed by adding together four neighboring pixels. That is, a pixel is added to the pixel one line above it on the screen, and the pixels directly adjacent these two pixels are added to the sum.

Existing ALUs perform simple functions such as addition, subtraction, boolean operations, and generation of ones or zeros. When processing images as described above, it is sometimes necessary to determine the maximum of two variables, the absolute value of a difference of two values, and to perform such functions as clipping addition (x+y=x+y or 65535, whichever is smaller) zero-clipping subtraction (x−y=x−y or zero, whichever is greater) and other complex functions which simple ALUs are incapable of performing.

SUMMARY OF THE INVENTION

The present invention is an arithmetic logic system, implemented on a single chip, for performing arithmetic and logical functions on a plurality of video data input streams. The invention is capable of performing a broad range of complex functions including absolute values, and signed or unsigned, clipped or unclipped, addition, subtraction and multiplication The invention is also capable of "averaging down" the input image stream.

In one embodiment of the present invention, two signal ALUs operate in series based on signals received from a control unit. Two pixel input streams and two constant values are input to a multiplexer and delay circuit. The multiplexer and delay circuit chooses among these inputs to produce two inputs to the system. The multiplexer and delay circuit has the capability of multiplying a selected two of the inputs so that the product of the two inputs may be selected as one of the inputs to the system.

The two system inputs are coupled to the first ALU wherein the ALU performs its operation on the two inputs based on instructions from the control unit. The output from this ALU is input to another multiplexer and delay circuit wherein the inputs to the second ALU may be selected. The multiplexer and delay circuit selects from among the two original ALU inputs, the output from the first ALU, and one of the constants originally input to the first multiplexer and delay circuit to produce two input values for the second ALU. After the control unit evaluates the output from the first ALU, the second ALU performs its operation on these two values based on instructions from the control unit. The result of the second operation is communicated to an output latch which forms a one-bit output stream and a 16-bit output stream.

The control unit has the capability of disabling the operation of either or both ALUs so that the output from the system comprises the unmodified value of one of the original inputs to the system.

The system also is capable of producing a half-size video image by skipping output of every other pixel and line of pixels.

Accordingly, Applicant's invention is capable of performing a number of functions unavailable with present ALUs or only available on discrete hardware. A detailed description of these functions and how they are implemented appears below.

BRIEF DESCRIPTION OF THE DRAWINGS

FIG. 1 is a block diagram of an arithmetic logic system according to the present invention.

FIGS. 2 and 3 are schematic diagrams of a preferred embodiment of the invention.

DESCRIPTION OF THE PREFERRED EMBODIMENTS

Overview

The present invention is an arithmetic logic system for performing arithmetic and logical functions on a plurality of video data input streams. The invention is also capable of "averaging down" the input image stream.

The general operation of the present invention may be understood by referring to FIG. 1. Stage 1 ALU 1 and Stage 2 ALU 2 are well-known arithmetic logic units which ordinarily add, subtract, perform basic boolean operations, and force ones or zeros in each output bit position. The operation of Stage 1 ALU 1 and Stage 2 ALU 2 is controlled by a control unit 3. Control unit 3 may be a programmable state machine or other well-known device. In general, control unit 3 will instruct Stage 2 ALU 2 to perform a certain operation based on the output of Stage 1 ALU 1. Control unit 3 also controls selection of inputs of the system multiplexers.

Processing begins at a multiplexer and delay circuit 4. Input to multiplexer and delay circuit 4 are two 16-bit standard pixel inputs labeled pixel inputs 5 and 6. Additionally, a "C" constant 7 and "D" constant 8 are input to multiplexer and delay circuit 4 to enable the circuit to perform arithmetic functions using constants when desired. "C" constant 7 and "D" constant 8 may be input from an external source or may be permanently resident in the chip as a matter of design choice.

A multiplier 9 is operatively coupled to multiplexer and delay circuit 4. The purpose of multiplier 9 is to multiply a multiplier input 10 and a multiplier input 11 to produce ALU input signal 13. Multiplier input signals 10 and 11 may be any one of pixel inputs 5 or 6, or "C" constant 7.

Multiplexer and delay circuit 4 will select among the inputs and produce Stage 1 ALU inputs 16 and 17. Stage 1 ALU 1 will perform its operation on Stage 1 ALU inputs 16 and 17 based on instructions from control unit 3 and received through a control line 19 to produce a Stage 1 ALU output 20. Stage 1 ALU output 20 is fed to control unit 3 so that it may decide which operation Stage 2 ALU 2 is to perform. Stage 1 ALU output 20 is also fed to a multiplexer and delay circuit 22 which acts as an interface to Stage 2 ALU 2. Multiplexer and delay circuit 22 will select among Stage 1 ALU inputs 16 and 17, "D" constant 8 and Stage 1 ALU output 20 based on instructions from control unit 3 and received through a control line 23 to produce Stage 2 ALU inputs 25 and 26.

Stage 2 ALU 2 will perform its operation on Stage 2 ALU inputs 25 and 26 based on signals from control unit 3 received through a control line 28 to produce Stage 2 ALU output 29. Stage 2 ALU output 29 is fed to control unit 3 and to an output module 31. Output module 31 will provide outputs 34 and 35 based on instructions from control unit 3 received through a control line 32. Output 34 is a one-bit signal and output 35 is a 16-bit signal.

Control unit 3 has one of its inputs a disable signal 37. Disable signal 37 is used when control unit 3 is to inhibit operation of Stage 1 ALU 1 and/or Stage 2 ALU 2 so that the outputs from these modules will remain unchanged from their input values.

Two 3-bit synchronization signals 40,41 are input to control unit 3 for use during the "average down" operation. Control unit 3 will use synchronization signals 40,41 to instruct output module 31 to skip output of every other pixel and line of pixels so that a half-size image is produced.

DETAILED DESCRIPTION

FIGS. 2 and 3 are schematic diagrams of a preferred embodiment of the invention. Referring now to FIG. 2, one will see that pixel inputs 5 and 6 are 16-bit standard pixel inputs. Pixel input 5 is input to the system by way of an input latch 43 which produces a latch output 44. Latch output 44 is input to a shifter complementer 45. Shifter complementer 45 optionally complements and/or downshifts some number of bits to produce an ALU input signal 46.

Similarly, pixel input 6 is coupled to an input latch 51 which in turn produces a latch output 52. Latch output 52 is subsequently optionally complementary and/or downshifted some number of bits by a shifter complementer 53 to produce an ALU input signal 54.

ALU input signals 46 and 54 are input to both multiplexers 61 and 62. "C" constant 7 is input to multiplexer 62. Multiplexer 61 will select either ALU input signal 46 or ALU input signal 54 and will allow the selected input signal to appear as multiplexer input 10. Similarly, multiplexer 62 will select ALU input signal 46, ALU input signal 54, or "C" constant 7 and will allow the selected input signal to appear as multiplier input 11. Selection of inputs in this manner allows multiplier 63 to perform one of the following operations: $A \times A$, $A \times B$, $A \times C$, $B \times C$, or $B \times B$ where A=ALU input signal 46, B=ALU input signal 54, and C="C" constant 7.

Multiplier 63 multiplies multiplier input signals 10 and 11 to produce a multiplier output 66. A barrel shifter 69 normalizes multiplier output 66 to produce an ALU input signal 13 which is input to a multiplexer 75.

Input to the ALU is made through multiplexers 75 and 78. Because of the hardware delay inherent in the generation of ALU input signal 13, it is necessary to delay ALU input signals 46 and 54 so that they will appear at the multiplexer inputs at approximately the same time as ALU input signal 13. This is accomplished by coupling ALU input signal 46 to a delay 81 to produce an ALU input signal 82. ALU input signal 82 is then fed to multiplexers 75 and 78. Similarly, ALU input signal 54 is coupled to a delay 84 to produce an ALU input signal 85 which is subsequently fed to multiplexers 75 and 78. "C" constant 7 and "D" constant 8 are input to multiplexer 78.

Multiplexer 78 will select ALU input signal 82, ALU input signal 85, "C" constant 7, or "D" constant 8 and will allow the selected signal to appear as Stage 1 ALU input signal 16. Similarly, multiplexer 75 will select ALU input signal 82, ALU input signal 85, or ALU input signal 13 and will allow the selected signal to appear as Stage 1 ALU input signal 17.

Referring now to FIG. 3, one will note that Stage 1 ALU inputs 16 and 17 are coupled to Stage 1 ALU 1. Stage 1 ALU performs its operation on Stage 1 ALU inputs 16 and 17 based on instructions from control unit 3 and received through control line 19 to produce Stage 1 ALU output 20. Stage 1 ALU output 20 is then coupled to a multiplexer 91 and control unit 3.

Input to Stage 2 ALU 2 is controlled by multiplexers 91 and 94. Multiplexer 91 has as its inputs Stage 1 ALU output 20 and a Stage 1 ALU input 93. Stage 1 ALU input 93 is Stage 1 ALU input 17 delayed in time by a delay 90. The purpose of delay 90 is to prevent Stage 1 ALU input 17 from appearing at the input of multiplexer 91 until after control unit 3 has analyzed Stage 1 ALU output 20 and has decided what operation Stage 2 ALU 2 will perform. Multiplexer 91 will select Stage 1 ALU output 20 or Stage 1 ALU input 93 and produce stage 2 ALU input 26 which is input to Stage 2 ALU 2.

Stage 2 ALU input 2 is delayed by a delay 100 to produce a Stage 2 ALU input 101 which is input to multiplexer 94 for use in the "average down" function to be described later.

Multiplexer 94 has as its inputs "D" constant 8, a Stage 1 ALU input 99 (which is Stage 1 ALU input 16 delayed in time by a delay 96) and Stage 2 ALU input 101. The purpose of delay 96 is similar to delay 90; that is, Stage 1 ALU input 16 must be delayed in time until the control unit has had the opportunity to analyze Stage 1 ALU output 20 and has decided what operation Stage 2 ALU 2 will perform. Multiplexer 94 selects "D" constant 8, Stage 1 ALU input 99, or Stage 2 ALU input 101 to produce Stage 2 ALU input 25.

Stage 2 ALU 2 will perform its operation on Stage 2 ALU inputs 25 and 26 based on instructions from control unit 3 and received through control line 28 to produce Stage 2 ALU output 29. Stage 2 output 29 is coupled to output latch 31 which produces corresponding output signals 34 and 35 based on instructions from control unit 3 and received through control line 32.

Operation

Turning now to the operation of the system, the general ALU usually performs operations of addition, subtraction, boolean functions and generation of ones and zeros. However, because the invention is made up of two such general ALUs, it is possible to support many additional signal processing operations.

The following table lists the operations that the invention supports given inputs "X" and "Y". X and/or Y can be any one of pixel inputs 5 or 6, "C" constant 7, or "D" constant 8. All symmetrical versions of these operations are included (e.g., $X-Y$ and $Y-X$), and, in most cases, both 16-bit signed and unsigned variations of the operations are included.

$X+Y$
$X-Y$
$max(X,Y)$
$min(X,Y)$
$abs(X-Y)$
$max(X-Y,0)$ [half-wave rectifying]
$min(X+Y, 65535)$ [unsigned clipping addition]
$min(X-Y, 65535)$ [unsigned clipping subtraction]
$max(min(X+Y,+32767),-32768)$ [signed clipping addition]
$max(min(X-Y,+32767),-32768)$ [signed clipping subtraction]
$and(X,Y)$
$or(X,Y)$
$nand(X,Y)$
$xor(X,Y)$
$select(X)$
$not(X)$
$neg(X)$
$X-1$
$X+1$
$X>Y$
$X\geq Y$
$X=Y$ The control logic accepts as input the sign bits of pixel inputs 5 and 6 and the sign bit and bit 15 of Stage 1 ALU output 20. How the above operations are supported by the ALUs will now be described.

To compute the absolute value of the unsigned arguments, Stage 1 ALU 1 subtracts pixel input 6 from pixel input 5. By checking the sign bit of Stage 1 ALU output 20, the control logic can determine if the result is a negative number (even if it overflows 16 bits of accuracy). If the result is positive, then Stage 2 ALU 2 simply performs the same operation to produce the final output. On the other hand, if pixel input 5 minus pixel input 6 yields a negative number (determined by inspection of the Stage 1 ALU output 20 sign bit) then Stage 2 ALU 2 is instructed to compute pixel input 6 minus pixel input 5 as the final output.

To perform unsigned zero clipping subtraction (half-wave reflecting), Stage 1 ALU 1 subtracts pixel input 6 from pixel input 5. If Stage 1 ALU output 20 does not contain a carry out of bit 15, then Stage 2 ALU 2 is instructed to generate zeros. If Stage 1 ALU output 20 does contain a carry out of bit 15, then Stage 2 ALU 2 is instructed to subtract pixel input 6 from pixel input 5 (the same function as Stage 1 ALU 1).

To perform unsigned clipping addition, Stage 1 ALU 1 adds pixel inputs 5 and 6. If Stage 1 ALU output 20 contains a carry out of bit 15, then control unit 3 instructs Stage 2 ALU 2 to generate ones in each of the 16 output bit positions, thus producing the binary equivalent 65535. If Stage 1 ALU output 20 does not contain a carry out of bit 15, then control unit 3 instructs Stage 2 ALU 2 to add pixel inputs 5 and 6.

To perform signed clipping addition, control unit 3 inspects the sign bits of pixel inputs 5 and 6. When both pixel inputs 5 and 6 are positive, then, after Stage 1 ALU 1 adds pixel inputs 5 and 6, Stage 1 ALU output 20 is checked for a one bit 15. If a one is found in bit 15, control unit 3 instructs Stage 2 ALU 2 to generate ones in all output bit positions of Stage 2 output 29 except bit 15 (thus producing +32767). If a one is not found in bit 15 of Stage 1 ALU output 20, then Stage 2 ALU 2 merely adds pixel inputs 5 and 6.

In the case where both pixel inputs 5 and 6 have negative sign bits, then, after Stage 1 ALU 1 adds pixel inputs 5 and 6, control unit 3 again checks bit 15 of Stage 1 ALU output 20. This time, if no one is found in bit 15 of Stage 1 ALU output 20, control unit 3 instructs Stage 2 ALU 2 to generate ones in all bit positions of Stage 2 output 29 (producing −32768). If a one is found in bit 15 of Stage 1 ALU output 20, then control unit 3 instructs Stage 2 ALU 2 to add pixel inputs 5 and 6.

In the case where one pixel input is negative and the other pixel input is positive, then Stage 2 ALU 2 is automatically commanded to add pixel inputs 5 and 6.

To perform unsigned subtraction with clipped, signed results, bit 15 of pixel inputs 5 and 6 are checked. In all cases, except when pixel input 5 contains a one in bit 15 and pixel input 6 contains a zero in bit 15, control unit 3 instructs Stage 2 ALU 2 to subtract pixel input 6 from pixel input 5. In the case where bit 15 of pixel input 5 is one and bit 15 of pixel input 6 is zero, then, after Stage 1 ALU 1 subtracts pixel input 6 from pixel input 5, bit 15 of Stage 1 ALU output 20 is checked. If bit 15 of Stage 1 ALU output 20 contains a one, then control unit 3 instructs Stage 2 ALU 2 to generate ones in all bit positions of Stage 2 output 29 except bit 15. If no one is found in bit 15 of Stage 1 ALU output 20, then control unit 3 instructs Stage 2 ALU 2 to subtract pixel input 6 from pixel input 5.

Signed clipping subtraction is similar to signed clipping addition.

To perform the absolute value difference of signed pixel inputs 5 and 6, Stage 1 ALU 1 subtracts pixel input 6 from pixel input 5 and bit 15 of Stage 1 ALU output 20 is checked. If bit 15 of Stage 1 ALU output 20 contains a one, then control unit 3 instructs Stage 2 ALU 2 to subtract pixel input 5 from pixel input 6. If no one is found in bit 15 of Stage 1 ALU output 20, then control unit 3 instructs Stage 2 ALU 2 to subtract pixel input 6 from pixel input 5.

To perform the max of signed pixel inputs 5 and 6, Stage 1 ALU subtracts pixel input 6 from pixel input 5 and checks bit 15 of Stage 1 ALU output 20. If bit 15 of Stage 1 ALU output 20 contains a one, then control unit 3 instructs Stage 2 ALU 2 to select pixel input 6. If no one is found in bit 15 of Stage 1 ALU output 20, then control unit 3 instructs Stage 2 ALU 2 to select pixel input 5.

Finally, to perform the minimum of signed pixel inputs 5 and 6, Stage 1 ALU 1 subtracts pixel input 6 from pixel input 5 and checks bit 15 of Stage 1 ALU output 20. If bit 15 of Stage 1 ALU output 20 contains a one, then control unit 3 instructs Stage 2 ALU 2 to select pixel input 5. If no one is found in bit 15 of Stage 1 ALU output 20 then control unit 3 instructs Stage 2 ALU 2 to select pixel input 6.

Disable input 37 allows an external image mask bit plane to selectively disable the ALU processing on a pixel by pixel basis. When disable bit 37 is low, the processing proceeds normally. When disable bit 37 is high, control unit 3 instructs Stage 1 ALU 1 and Stage 2 ALU 2 to select pixel input 5 without performing any other function. A control bit generated within control unit 3 causes pixel input 6 to be the disable output when that is desired.

In the average down mode, pixel inputs 5 and 6 come from a digital delay line; e.g., pixel input 6 is a one-line delayed copy of pixel input 5. Stage 1 ALU 1 adds pixel inputs 5 and 6. Then Stage 2 ALU 2 adds Stage 1 ALU output 20 (the result of the Stage 1 ALU 1 addition) with the previous value produced by Stage 1 ALU 1 one pixel clock period earlier. This one pixel clock delay is obtained by delay 100. Thus the result of the Stage 2 ALU 2 addition is the addition of four neighboring pixels. To complete the average-down function, synchronization signals 40 and 41 are instructed by the sync control circuit to skip output of every other pixel and line of pixels.

From the foregoing, it is apparent that the present invention progresses beyond the limitations of the prior art with elegant simplicity and allows, on a single chip, a combination of functions previously unavailable or only available on discrete hardware.

While the above is a complete description of a preferred embodiment of the present invention, various modifications may be employed. For example, the inputs are not limited to those specifically described. Inputs may be exclusively pixel inputs or exclusively constants or any combination thereof. The number of inputs may be increased or decreased as desired. Furthermore, the number of multiplexers and the method of connection may be altered depending on selectivity desired or any other design preference. Delays may be added or subtracted depending on design choice and hardware constraints. The control unit may control the system based on any algorithm which will produce the desired result.

Consequently, the description should not be used to limit the scope of the invention which is properly set out in the claims.

What is claimed is:

1. An arithmetic logic system for performing arithmetic and logical functions on a plurality of input signals comprising:
   input signal means for receiving a plurality of input signals;
   a first arithmetic logic means, coupled to the input signal means, for performing arithmetic and logic functions on the input signals;
   a second arithmetic logic means connected for receiving output signals from the first arithmetic logic means, for performing arithmetic and logic functions on the output signals from the first arithmetic logic means; and
   control means, coupled to the first and second arithmetic logic means, for controlling the operation of the second arithmetic logic means in response to the output signals from the first arithmetic logic means.

2. An arithmetic logic system as in claim 1, wherein the input signal means further comprises:
   a first input means for receiving a first input signal;
   a second input means for receiving a second input signal; and
   a constant input means for receiving an input signal having a constant value.

3. An arithmetic logic system as in claim 2, wherein the input signal means further comprises:
   multiplier means for performing multiplication of a selected plurality of multiplier input signals and for providing a multiplier output signal which is a product of the selected plurality of multiplier input signals; and
   first multiplexing means, coupled to the multiplier means, for selectively providing the plurality of input signals to the multiplier means as multiplier input signals.

4. An arithmetic logic system as in claim 3, further comprising a second multiplexing means, coupled to the input signal means, to the multiplier means and to the first arithmetic logic means, for selectively providing the plurality of input signals and the multiplier output signal to the first arithmetic logic means.

5. An arithmetic logic system as in claim 4, further comprising a third multiplexing means coupled to the input signal means, to an output terminal of the first arithmetic logic means and to an input terminal of the second arithmetic logic means, for selectively providing the plurality of input signals and the output signals from the first arithmetic logic means to the second arithmetic logic means.

6. An arithmetic logic system as in claim 5, wherein the third multiplexing means further comprises delay means, connected for receiving the output signals from the first arithmetic logic means, for delaying a copy of the output signals from the first arithmetic logic means and for providing the delayed output signals to the second arithmetic logic means.

7. An arithmetic logic system as in claim 6, wherein the input signal means further comprises shifter means for optionally shifting the input signals by a prescribed number of bits.

8. An arithmetic logic system as in claim 7, wherein the multiplier means further comprises a barrel shifter, connected to an output terminal of the multiplier, for selectively downshifting the multiplier output signals by a prescribed number of bits.

9. An arithmetic logic system as in claim 8, further comprising disable means, coupled to the first and second arithmetic logic means, for selectively inhibiting the first or second arithmetic logic means so that an output signal from the inhibited arithmetic logic means is identical to the input signal to that inhibited arithmetic logic means.

10. The arithmetic logic system according to claim 6, wherein the input signal means further comprises complement means for optionally complementing the input signals.

11. The arithmetic logic system according to claim 6 wherein the delay means delays the copy of the output signals from the first arithmetic logic means by one clock period.

12. An arithmetic logic system for performing arithmetic and logical functions on a plurality of pixel input signals comprising:

pixel input means for receiving a plurality of pixel input signals;

a first arithmetic logic means, connected to the pixel input means, for performing arithmetic and logic functions on the pixel input signals;

a second arithmetic logic means, connected for receiving output signals from the first arithmetic logic means, for performing arithmetic and logic functions on the output signals from the first arithmetic logic means; and control means, connected to the first and second arithmetic logic means, for controlling the operation of the second arithmetic logic means in response to the output signals from the first arithmetic logic means.

13. The arithmetic logic system according to claim 12 wherein the control means controls the operation of the second arithmetic logic means in response to a value of an output signal from the first arithmethic logic means.

14. An arithmetic logic system for performing arithmetic and logical functions on a plurality of pixel input signals comprising:

a pixel input means for receiving a plurality of pixel input signals;

a pair of arithmetic logic units, the first arithmetic logic unit being connected to the pixel input means for performing arithmetic and logic functions on the pixel input signals, and the second arithmetic logic unit being connected for receiving output signals from the first arithmetic logic unit for performing arithmetic and logic functions on the output signals; and control means, connected to the first and second arithmetic logic means, for analyzing the output signals from the first arithmetic logic unit and for controlling the operation of the second arithmetic logic means in response to a value of the output signals from the first arithmetic logic unit.

* * * * *